(12) United States Patent
Dahab

(10) Patent No.: US 10,617,243 B2
(45) Date of Patent: Apr. 14, 2020

(54) VACUUM INSULATED CONTAINER FOR SELECTIVELY DISPENSING TWO FLUIDS OF DIFFERENT TEMPERATURES

(71) Applicant: Christina Dahab, Miramar, FL (US)

(72) Inventor: Christina Dahab, Miramar, FL (US)

( * ) Notice: Subject to any disclaimer, the term of this patent is extended or adjusted under 35 U.S.C. 154(b) by 0 days.

(21) Appl. No.: 15/881,729

(22) Filed: Jan. 27, 2018

(65) Prior Publication Data

US 2019/0231102 A1    Aug. 1, 2019

(51) Int. Cl.
| | |
|---|---|
| *A47J 41/00* | (2006.01) |
| *A47G 19/22* | (2006.01) |
| *B65D 1/04* | (2006.01) |
| *B65D 81/38* | (2006.01) |
| *B65D 47/28* | (2006.01) |
| *A47J 41/02* | (2006.01) |
| *B65D 81/32* | (2006.01) |
| *A47G 19/12* | (2006.01) |

(52) U.S. Cl.
CPC ..... *A47G 19/2288* (2013.01); *A47G 19/2272* (2013.01); *A47J 41/024* (2013.01); *A47J 41/028* (2013.01); *B65D 47/286* (2013.01); *B65D 81/3283* (2013.01); *B65D 81/3869* (2013.01); *A47G 2019/122* (2013.01)

(58) Field of Classification Search
CPC ............ A47G 19/2288; A47G 19/2272; A47G 2019/122; A47J 41/024; A47J 41/028; A47J 41/0055; A47J 41/022; A47J 41/0027; B65D 47/286; B65D 2543/00046; B65D 43/20

USPC ...... 220/592.17, 500; 222/138, 142.1, 142.2, 222/142.6, 142.7, 142.8, 144.5, 506, 561, 222/507, 481, 511–518, 94, 129; 215/6, 215/12.1; 221/92, 94, 96
See application file for complete search history.

(56) References Cited

U.S. PATENT DOCUMENTS

| | | | | |
|---|---|---|---|---|
| 1,226,759 | A * | 5/1917 | John ...................... | A47G 19/24 222/142.7 |
| 2,000,818 | A * | 5/1935 | Bomberger .......... | B65D 47/286 222/142.1 |
| 2,152,271 | A * | 3/1939 | Robert ................. | B65D 47/286 222/484 |
| 2,241,044 | A * | 5/1941 | Stenberg .............. | B65D 47/265 222/142.9 |
| 2,652,951 | A * | 9/1953 | Esposito .............. | B65D 47/286 222/142.1 |

(Continued)

*Primary Examiner* — Gideon R Weinerth

(57) ABSTRACT

A vacuum insulated container for storing and selectively dispensing two fluids of different temperatures serves to insulate and selectively dispense two segregated fluids having different temperatures from the container. The vacuum insulated container provides a body that is bifurcated into two compartments separated by vacuum insulated walls. The first compartment contains a fluid of a first temperature, and the second compartment contains a fluid of a second temperature. The vacuum insulated container further provides a cap having two tabs that selectively open and close independently of each other, so that only one tab can be opened to access the desired fluid. Sliding the first tab to the open position releases a tensioned locking member to lock the second tab in the closed position, and displacing the second tab to the open position releases the tensioned locking member to lock the first tab in the closed position.

20 Claims, 5 Drawing Sheets

(56) References Cited

U.S. PATENT DOCUMENTS

| | | | | |
|---|---|---|---|---|
| 3,245,565 A * | 4/1966 | Zeppenfeld | A47J 41/02 | 215/12.1 |
| 3,337,073 A * | 8/1967 | Angelo | A47J 41/02 | 215/12.1 |
| 3,705,661 A * | 12/1972 | Davis | A47J 41/02 | 215/12.1 |
| 5,062,550 A * | 11/1991 | Singh | A23G 3/2023 | 222/132 |
| 5,240,145 A * | 8/1993 | Hogberg | A47G 19/12 | 222/131 |
| 5,307,950 A * | 5/1994 | Li | A47G 19/2266 | 215/2 |
| 6,648,158 B1 * | 11/2003 | Lawrence | B65D 55/16 | 215/306 |
| 7,270,244 B1 * | 9/2007 | Liu | A47J 41/0011 | 215/13.1 |
| 7,975,868 B1 * | 7/2011 | Flies | B65D 1/24 | 215/12.1 |
| 8,328,044 B1 * | 12/2012 | Iskandar | A47G 19/2272 | 220/254.3 |
| 8,695,836 B1 * | 4/2014 | Gregory | B65D 23/106 | 215/387 |
| 8,844,316 B1 * | 9/2014 | Ademola | F25D 3/08 | 62/293 |
| D736,565 S * | 8/2015 | Wright | D7/541 | |
| 9,872,587 B1 * | 1/2018 | Dipaolo | A47J 41/0055 | |
| 2006/0201949 A1 * | 9/2006 | Byrd | A47G 19/2272 | 220/507 |
| 2007/0170184 A1 * | 7/2007 | Canedo | A45F 3/18 | 220/254.9 |
| 2007/0181581 A1 * | 8/2007 | Ross | A47G 19/22 | 220/501 |
| 2007/0278228 A1 * | 12/2007 | Wong | B65D 47/286 | 220/254.9 |
| 2008/0110899 A1 * | 5/2008 | Gustafson | A47G 19/14 | 220/553 |
| 2009/0188929 A1 * | 7/2009 | Sims | A47G 19/2205 | 220/710 |
| 2009/0218357 A1 * | 9/2009 | Byrd et al. | 220/592.2 | |
| 2009/0283491 A1 * | 11/2009 | Wang | B65D 51/20 | 215/6 |
| 2011/0089180 A1 * | 4/2011 | Kolbasi | A47J 41/0027 | 220/592.27 |
| 2013/0001233 A1 * | 1/2013 | Hylton | A47G 19/2272 | 220/592.2 |
| 2015/0144516 A1 * | 5/2015 | Shamoon | B65D 25/04 | 206/459.1 |
| 2015/0359363 A1 * | 12/2015 | Charya | A47G 19/2227 | 426/2 |
| 2017/0208975 A1 * | 7/2017 | Ross | B65D 43/14 | |
| 2018/0029752 A1 * | 2/2018 | Clark | B65D 25/04 | |

* cited by examiner

VACUUM INSULATED CONTAINER FOR SELECTIVELY DISPENSING TWO FLUIDS OF DIFFERENT TEMPERATURES

FIELD OF THE INVENTION

The present invention relates generally to a vacuum insulated container for storing and selectively dispensing two fluids of different temperatures. More so, the present invention relates to a vacuum insulated container bifurcated into two compartments that are separated by vacuum insulation for containing a first fluid of a first temperature and a second fluid of a second temperature; and further providing a cap having two independent tabs that selectively open and close independently of each other, so that only one tab can be opened at one time to access the desired fluid.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, a thermal, or vacuum flask is an insulating storage vessel that greatly lengthens the time over which its contents remain hotter or cooler than the flask's surroundings. The vacuum flask consists of two flasks, placed one within the other and joined at the neck. The gap between the two flasks is partially evacuated of air, creating a near-vacuum which significantly reduces heat transfer by conduction or convection.

In many instances the occupants of moving vehicles attempt to carry beverage containers with them and to imbibe while driving or riding. It is the practice of many individuals to carry coffee, tea, and soft drinks in containers to sip while traveling in vehicles. However, because of the sway, vibration and bouncing movement encountered in most automobiles, trucks, trains, bicycles, and other vehicles, beverages frequently spill over the rim of a conventional open mouthed cup. Moreover, the motion transmitted from the vehicle will tilt and jostle a container, causing it to be upset from an otherwise stable upright position, and to spill on its side. The beverage is thus totally lost and unavailable for consumption. Also, such spillage creates a mess which is difficult to clean and which represents a source of extreme frustration and annoyance to travelers.

Moreover, when the liquid within the container is hot, such as hot coffee, liquid spilling over the side of the cup burns the fingers of a person holding the cup. This represents a considerable hazard since the individual holding the cup wishes to hurriedly put the cup down in order to wipe the hot liquid from his fingers, but cannot do so without further inattention to driving. Moreover, the liquid in the container is likely to spill entirely if the cup is placed on the seat or floor since the individual holding the cup can no longer cushion it from road shocks and swaying movement.

It is often desirable to have two different fluidic beverages available simultaneously for selective consumption or for mixing. This is especially true in the case of present day coffee service as both ordinary coffee and decaffeinated coffee have substantial popularity and commonly are served simultaneously. This need has been considered in the past and responsively various serving containers for the selective service of two or more beverages have heretofore become known.

It is therefore desirable that containers for consuming hot or cold beverages provide some means for maintaining the temperature of a contained beverage. This need has been met primarily by providing a container of thin walled construction and with relatively high heat conductivity that is maintained in an appropriate thermal environment during storage or other non-use periods. Or by providing a container of thicker walled, thermally insulative construction that has a sufficiently low thermal conductivity so that it may be stored for periods of time in areas of different ambient temperature and yet maintain the temperature of contained beverages.

Vacuum insulated containers variously known as vacuum or thermos bottles or Dewar flasks have been in use for a substantial number of years to provide thermal insulation for various materials desired to be held at or near a particular temperature for prolonged periods of time. Such containers consist of a double-walled receptacle formed of either metal or glass with the space between the walls being evacuated so as to provide the best possible vacuum in that space. Because the vacuum or substantial vacuum in that space is a very poor conductor of heat, there is consequently a minimum of heat loss through the container walls.

Other proposals have involved thermal vessels that maintain fluids at temperatures for a duration. The problem with these containers is that they do not maintain two distinct fluids at separate temperatures. Also, the two fluids cannot be dispensed independently of each other, where if one is opened, the other remains closed. Even though the above cited containers meets some of the needs of the market, a vacuum insulated container bifurcated into two compartments that are separated by vacuum insulation for containing a first fluid of a first temperature and a second fluid of a second temperature; and further providing a cap having two independent tabs that selectively open and close independently of each other, so that only one tab can be opened at one time to access the desired fluid is still desired.

SUMMARY

Illustrative embodiments of the disclosure are generally directed to a vacuum insulated container for storing and selectively dispensing two fluids of different temperatures. The vacuum insulated container serves to insulate and selectively dispense two segregated fluids having different temperatures from the container. The vacuum insulated container provides a body that is bifurcated into two compartments separated by vacuum insulated walls, with the first compartment containing a fluid of a first temperature, and the second compartment containing a fluid of a second temperature. The vacuum insulated container further provides a cap having two tabs that selectively open and close independently of each other, so that only one tab can be opened to access the desired fluid.

In one embodiment, a vacuum insulated container comprises a body defined by a base wall. The body also comprises a side wall extending from the base wall and terminating at an upper portion that forms an open mouth. The body also comprises a medial wall bifurcating the body into a first compartment and a second compartment forming two segregated inner volumes. The walls consist of two barriers made of a heat insulating material. The barriers are separated by a space, wherein the space between the barriers is substantially evacuated to provide vacuum insulation.

In another embodiment, the vacuum insulated container comprises a cap carried by the upper portion of the side wall. The cap is defined by an inner face, an outer face, and a perimeter region detachably coupled to the open mouth of the side wall. The cap has a first tab positioned over the inner volume of the first compartment. The cap also has a second tab positioned over the inner volume of the second compartment. The cap also has a tensioned locking member operatively connected to the tabs.

The tabs enable access to the inner volumes of the compartments from an open position, and conversely, the tabs restrict access to the inner volumes of the compartments from a closed position. Additionally, each tab is slidable to the open position independently of the other, wherein sliding the first tab to the open position releases the locking member to lock the second tab in the closed position, and sliding the second tab to the open position releases the locking member to lock the first tab in the closed position. In this manner, selective disbursement of two fluids carried from either compartment is possible. And specifically, a hot fluid and a cold fluid can share the same container and be consumed independently of each other.

In another aspect, the heat insulating material includes at least one of the following: foam, polyurethane, polyvinyl chloride, polystyrene, a polymer, glass-lined aluminum, double walled paper, ceramic material, stoneware, metal, wood, and glass.

In another aspect, the cap has a generally disc shape.

In another aspect, the container also includes an annular gripping portion that encircles a portion of the side wall of the body.

In another aspect, the gripping portion is textured.

In another aspect, the first tab slides between the open and closed positions.

In another aspect, the second tab slides between the open and closed positions.

In another aspect, the first tab and the second tab slide in a collinear direction.

In another aspect, the first tab slides along a pair of first rails.

In another aspect, the second tab slides along a pair of second rails.

In another aspect, the first tab to the open position releases the tensioned locking member upwardly, against the second tab.

In another aspect, the sliding the second tab to the open position releases the tensioned locking member upwardly, against the first tab.

In another aspect, the released locking member is arranged in a snug engagement with the first tab or the second tab.

One objective of the present invention is to retain and selectively dispense both hot and cold fluids from the same cup.

Another objective is to insulate the hot and cold fluids through a double-barrier of vacuum insulation and heat insulating material.

Another objective is to provide an insulating storage container that greatly lengthens the time over which its fluid contents remain hotter or cooler than the container's surroundings.

Yet another objective is to provide a textured gripping portion to facilitate manipulation of the cup.

Yet another objective is to provide a safety feature that allows only one tab to open at a time, so as to prevent spillage from the second tab while drinking from the first tab, or vice versa.

Yet another objective is to carry either a coffee chain or home brew beverage at a desired temperature longer than a frail disposable cup can withstand.

Yet another objective is to eliminate the conventional paper sleeve waste.

Yet another objective is to provide an environmentally friendly cup that is reusable. Rather than disposable, like a foam or paper cup.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

DETAILED DESCRIPTION OF THE INVENTION

Figure 1:
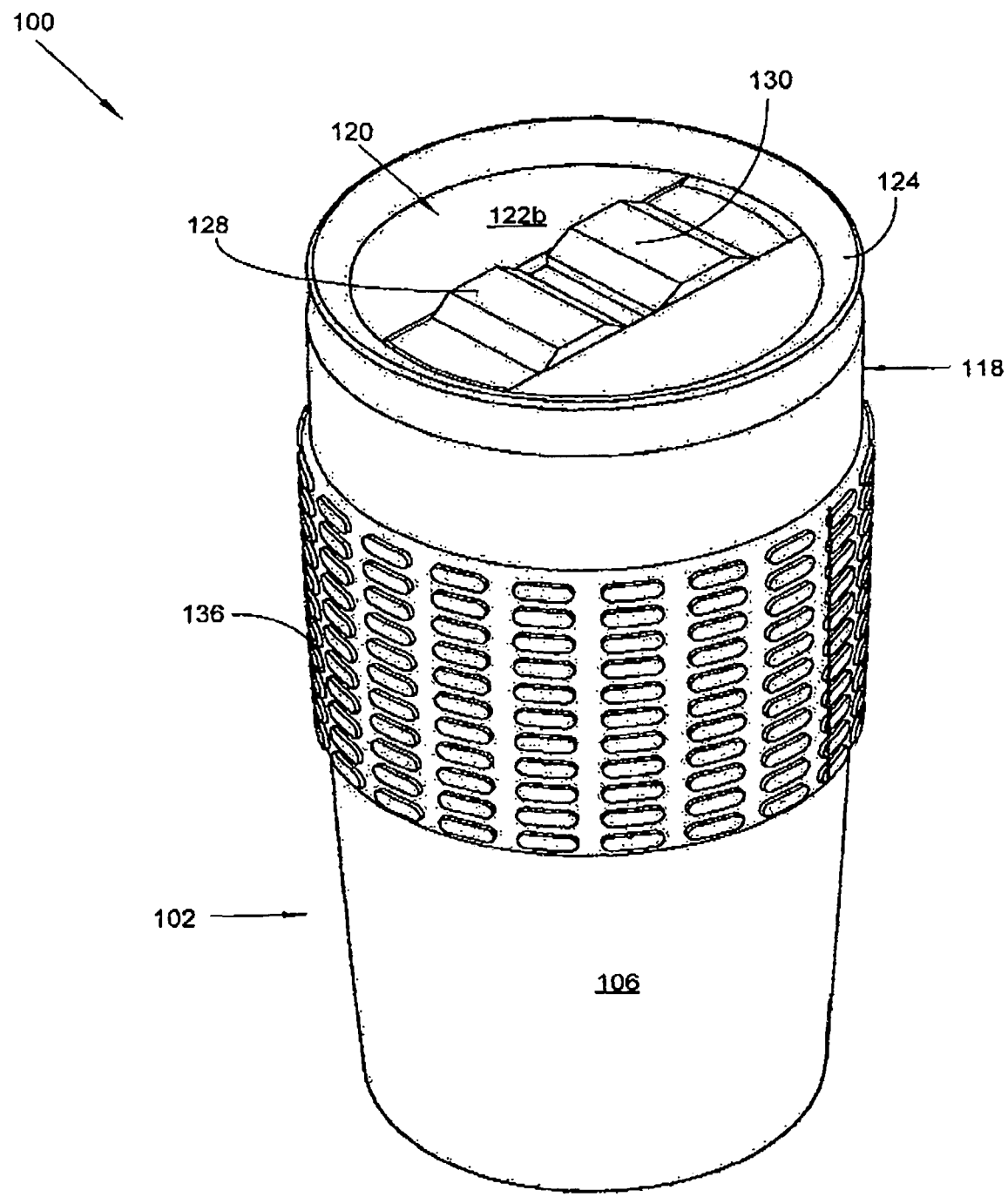
FIG. 1 illustrates a perspective view of an exemplary vacuum insulated container for storing and selectively dispensing two fluids of different temperatures, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A vacuum insulated container 100 for storing and selectively dispensing two fluids of different temperatures, is referenced in FIGS. 1-5. The vacuum insulated container 100, hereafter, "container 100" is configured for storing and selectively dispensing two fluids of different temperatures from the same body 102. The vacuum insulated container 100 provides an elongated, cylindrical body 102 that is bifurcated lengthwise into two compartments 110a, 110b. The compartments 110a-b are surrounded by, and separated by double-barrier vacuum insulated barriers 114a, 114b that create enhanced insulation between the fluids, so as to maintain their temperature integrity.

In one non-limiting embodiment, the first compartment 110a contains a fluid of a first temperature, i.e., hot; and the second compartment 110b contains a fluid of a second temperature, i.e., cold. The fluids maintain their temperatures independently of each other, so that when dispensed, the fluid temperatures do not affect each other. The vacuum insulated container 100 further provides a cap 120 that detachably covers the open mouth 126 of the body 102. The cap 120 comprises two independent tabs 128, 130 that selectively open and close independently of each other to dispense the desired fluid. The tabs 128, 130 are operable with a tensioned locking member 132 that is biased to lock the tabs 128, 130 in a closed position, so that only one tab 128 can be opened at a time to access one of the fluids. This provides a safety feature, for example, to prevent spillage from the second tab 130 while drinking from the first tab 128.

As referenced in FIG. 1, the container 100 comprises a generally elongated cylindrical body 102 that serves substantially to contain two fluids independently of each other. Though in other embodiments, the body 102 may have different shapes, dimensions, and functions. In one embodiment, the body 102 is defined by a base wall 104 that forms the foundation for the body 102 on a ground surface; thereby enabling stable, upright support of the container 100. The body 102 is further defined by a side wall 106 extending from the base wall 104, and terminating at an upper portion 118 that forms an open mouth 126. The open mouth 126 may have a generally circular shape. The side wall 106 may be tapered downwardly in some embodiments.

Figure 4:
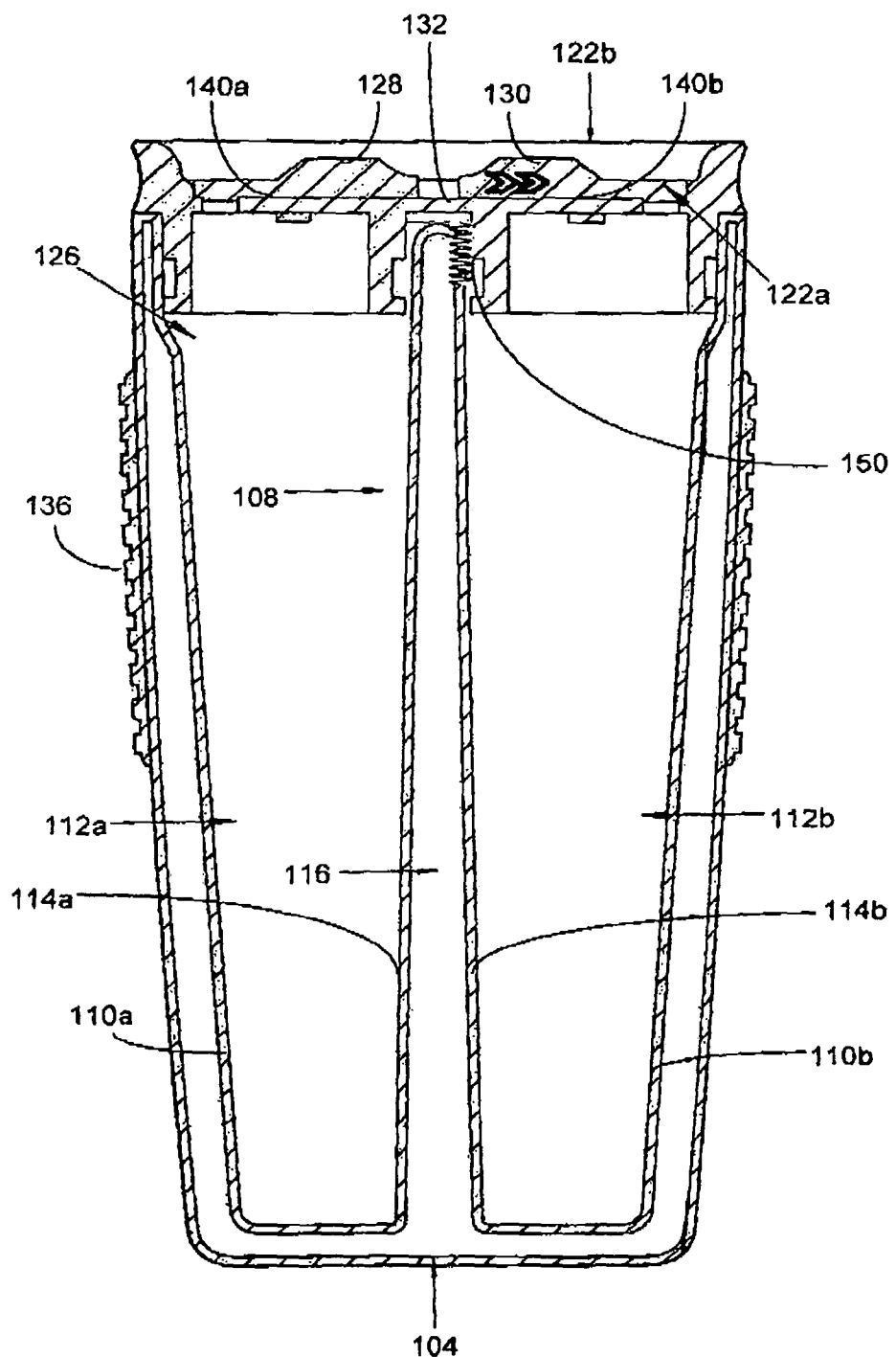
FIG. 4 illustrates a sectioned side view of the vacuum insulated container shown in FIG. 1, in accordance with an embodiment of the present invention.

Turning now to FIG. 4, the body 102 is further defined by a medial wall 108 that bifurcates the body 102 into a first compartment 110a and a second compartment 110b. This unique bifurcation creates two compartments 110a, 110b that form two segregated inner volumes 112a, 112b for containing a first fluid having a first temperature, and a second fluid having a second temperature. In one embodiment, the first fluid may include a hot beverage such as coffee, and the second fluid may include a cold beverage such as ice water or cold milk. Though any consumable liquid or gel may also be used.

To maintain temperature integrity for each compartment 110a, 110b, the base wall 104, the side wall 106, and the medial wall 108 consist of two barriers 114a, 114b. The barriers 114a, 114b are disposed in a parallel relationship. The barriers 114a, 114b are made of a heat insulating material. Suitable materials for the walls and barriers 114a, 114b may include, without limitation, foam, polyurethane, polyvinyl chloride, polystyrene, a polymer, glass-lined aluminum, double walled paper, ceramic material, stoneware, metal, wood, and glass.

In one non-limiting embodiment, the barriers 114a, 114b are separated by a space 116. The space 116 may be a few millimeters wide or greater. The space 116 between the barriers 114a, 114b is substantially evacuated to create a vacuum; and thereby provide vacuum insulation. The use of both heat insulating material, and vacuum insulation enhances insulation between the two compartments 110a-b, so as to maintain temperature integrity for each. In one alternative embodiment, the barriers 114a-b are coated with silver or other highly reflective material to enhance the insulative properties of the vacuum.

Figure 5:
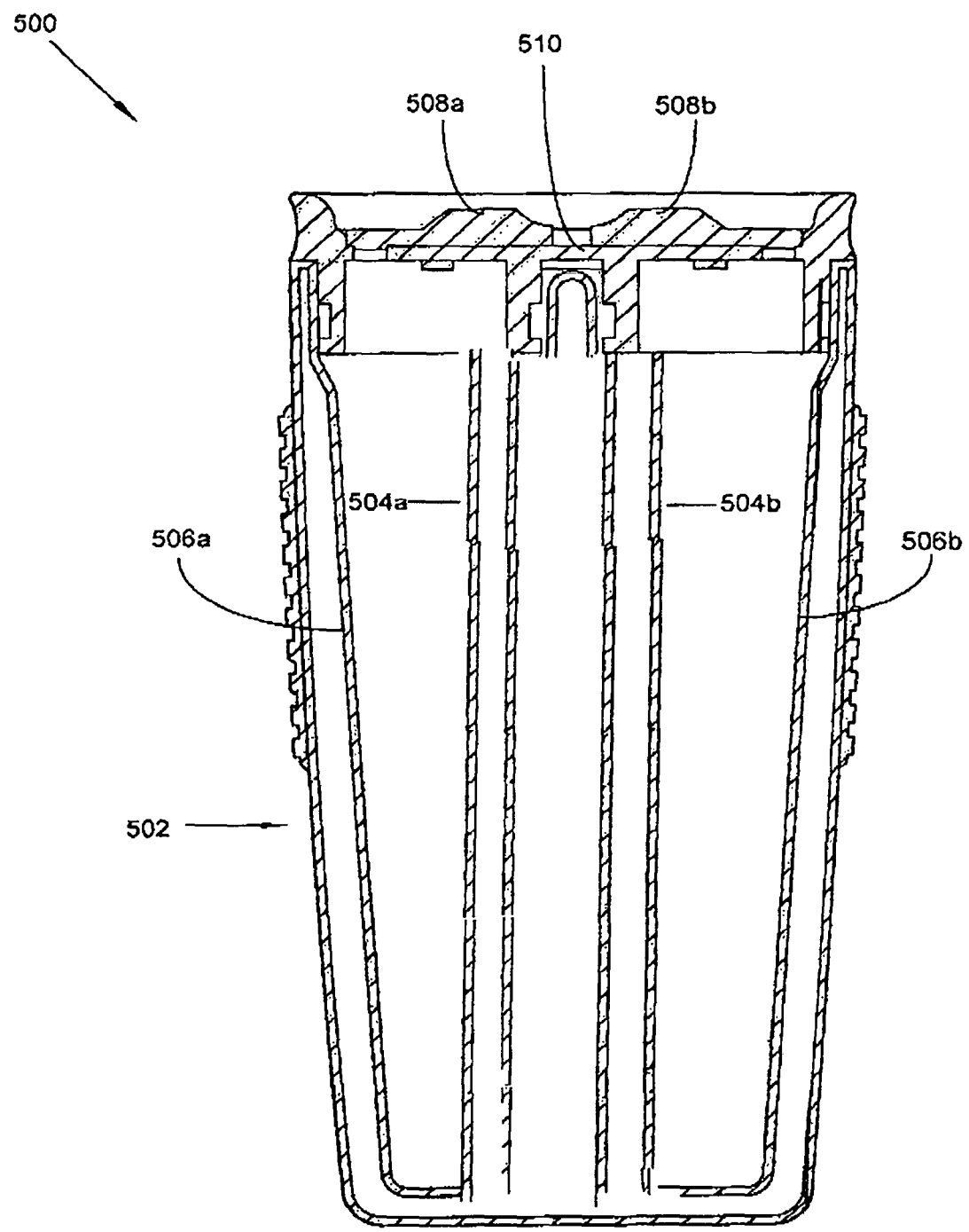
FIG. 5 illustrates a sectioned view of an exemplary alternative vacuum insulated container having for storing and selectively dispensing two fluids of different temperatures, in accordance with an embodiment of the present invention Like reference numerals refer to like parts throughout the various views of the drawings.

Looking now at an alternative embodiment of a double-walled container 500, shown in FIG. 5, a structure of the body 502 utilizes a first medial wall 504a and a second medial wall 504b adjacent, and parallel to the first medial wall 504a. The second medial wall 504b works to further enhance the insulation properties of the body 502 between the first and second compartments 506a, 506b. Thus, the use of two double-barriers fabricated from a heat insulating material, and separated by two vacuum spaces exponentially increases the insulation properties of the body 502. In this alternative embodiment 500, the tabs 508a, 508b, and the locking member 510 operate substantially the same as the aforementioned embodiment of container 100.

Those skilled in the art will recognize that vacuum insulated barriers consist of a gas-tight enclosure, from which the air has been evacuated. It is also recognized that heat transfer occurs by three modes: convection, conduction, and radiation. Creating a vacuum practically eliminates convection, since this relies on the presence of gas molecules able to transfer heat energy by bulk movement. A small decrease in pressure has no effect on the thermal conductivity of a gas, because the reduction in energy-carrying molecules is offset by a reduction in collisions between molecules. However, at sufficiently low pressure, the distance between collisions exceeds the size of the vessel, and then the conductivity does reduce with pressure. therefore achieve a much lower thermal conductivity (k-value) than conventional insulation, or in other words a higher thermal resistance per unit of thickness.

Figure 2:
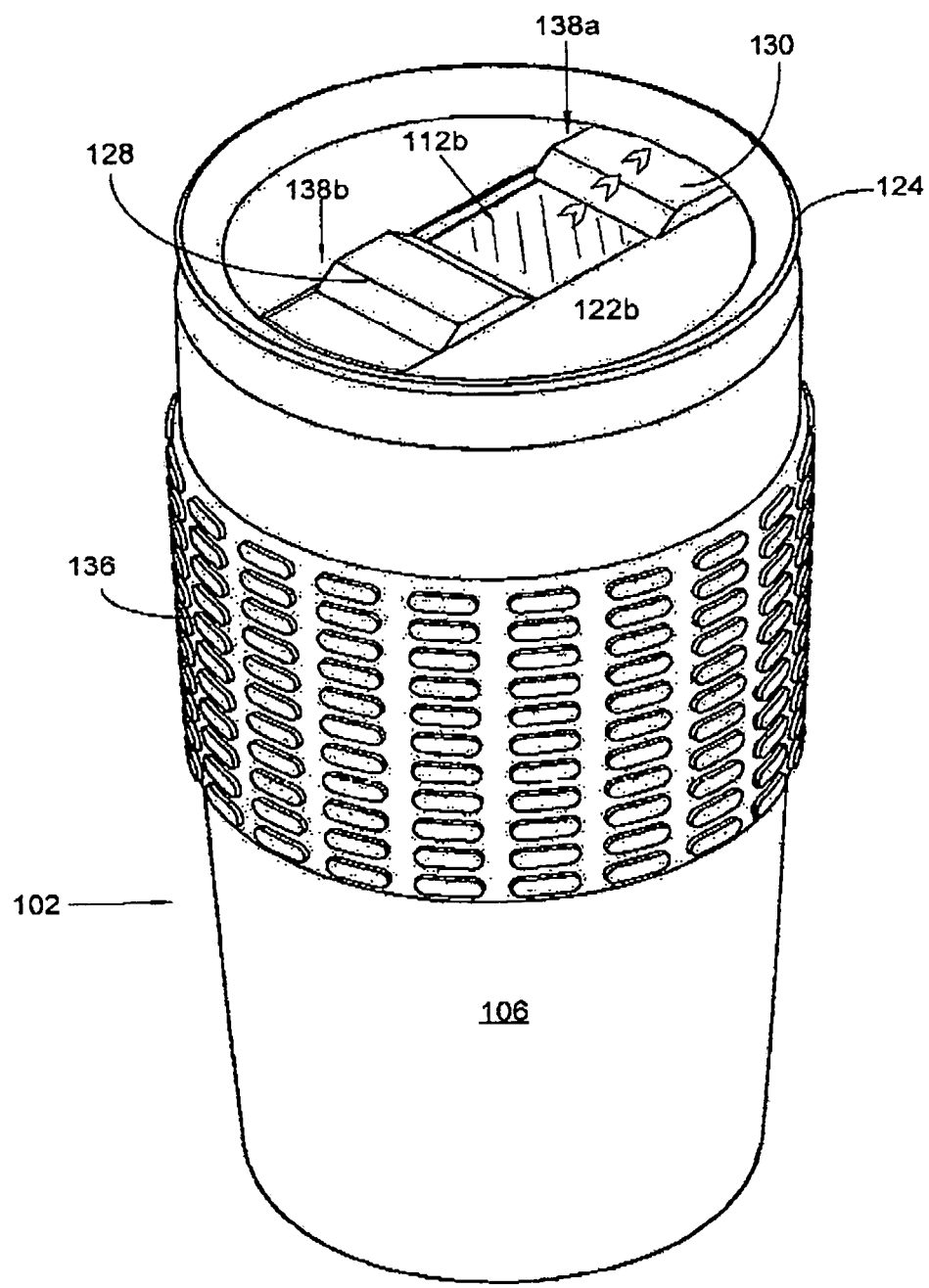
FIG. 2 illustrates a perspective view of the vacuum insulated container shown in FIG. 1, showing a first tab in a closed position, and a second tab in an open position, in accordance with an embodiment of the present invention
Figure 3:
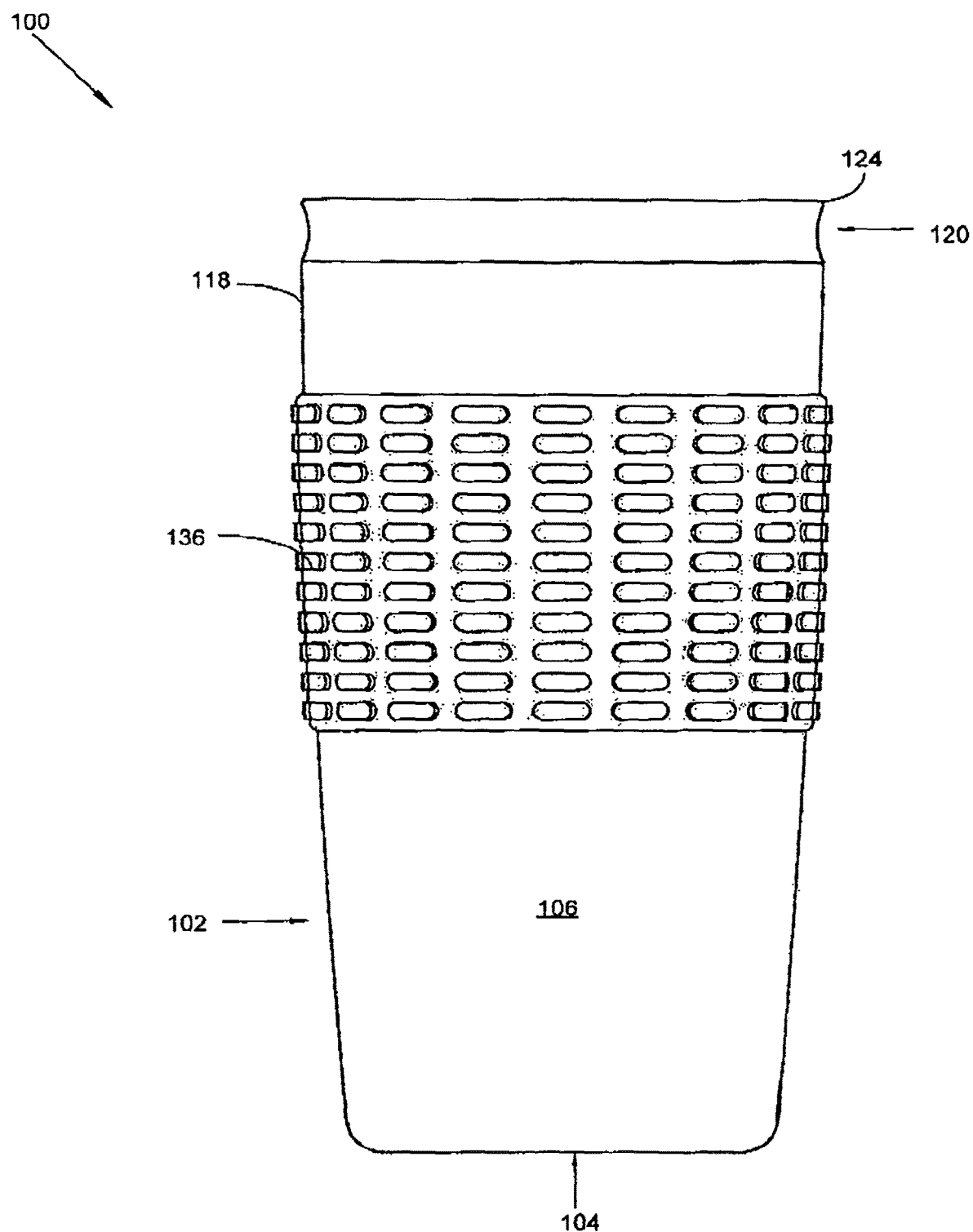
FIG. 3 illustrates an elevated side view of the vacuum insulated container shown in FIG. 1, in accordance with an embodiment of the present invention.

As FIG. 2 shows, the container 100 further comprises an annular gripping portion 136 that encircles a portion of the side wall 106 of the body 102. The gripping portion 136 is defined by a texture, or pattern, that enhances griping the container 100 while carrying or dispensing the fluids contained therein.

In some embodiments, the container 100 further comprises a disc-shaped cap 120 that is carried by the upper portion 118 of the side wall 106. Though in other embodiments, the cap 120 may have other shapes. The cap 120 covers the open mouth 126 and may be detachable through a snap fit relationship with the open mouth 126. Though a threaded relationship may also be used in other embodiments. The cap 120 is defined by an inner face 122a that faces inwardly towards the fluids in the compartments 110a-b and an oppositely disposed outer face 122b. The cap 120 is further defined by a perimeter region 124 that detachably couples to the open mouth 126 of the side wall 106.

The cap 120 has a first tab 128 positioned over the inner volume 112a of the first compartment 110a. The cap 120 further includes a second tab 130 positioned over the inner volume 112b of the second compartment 110b. In one non-limiting embodiment, the tabs 128, 130 may include a rectangular panel with a protrusion that provides a gripping surface for a thumb. The tabs 128, 130 may be collinear to each other.

The tabs 128, 130 enable access to the inner volumes 112*a-b* of the compartments 110*a-b* from an open position 138*a*. FIG. 2 illustrates second tab 130 moving to open position 138*a*. The open position 138*a* involves either one of the tabs 128, 130 being displaced, possibly by sliding, to uncover a hole in the cap 120 to access fluid in the first compartment 110*a*. Conversely, the tabs 128, 130 restrict access to the inner volumes 112*a-b* of the compartments 110*a-b* from a closed position 138*b*, which involves covering the hole in the cap 120. FIG. 2 illustrates first tab 128 locked into the closed position 138*b*.

Looking again at FIG. 4, the cap 120 further includes a tensioned locking member 132 operatively connected to the tabs 128, 130. The locking member 132 may include a rectangular panel that rests beneath the first and second tabs. The locking member 132 is configured to apply a tensioned force beneath the tabs 128, 130 (Tabs shown in FIG. 4). The locking member 132 is biased to press upwardly against the tabs 128, 130 to maintain the tabs in the closed position 138*b*. Specifically, the nonmoved tab is maintained in the closed position by a spring 150 pressing upwardly against the locking member 132. When forcibly displacing one of the tabs 128 to the open position 138*a*, the locking member 132 presses against the other tab 130 in a snug relationship that retains the other tab 130 in the closed position 138*b*. As FIG. 4 shows, a spring 150 can be used for this biasing. In this manner, displacing the first tab to the open position releases the tension locking member 132 to lock the second tab in the closed position. Displacing the second tab to the open position releases the tension locking member and locks the first tab in the closed position. The locking member 132 may go from pressing against both tabs in a closed configuration to an open configuration where the locking member is released to press against the other tab to maintain that tab in a closed position. The spring 150 presses upwardly against the tabs, such that one tab remains closed while the other tab slides independently of the nonmoving tab.

Turning now to FIG. 4, the cap 120 further comprises a pair of rails 140*a*, 140*b* for the tabs 128, 130 to slide along. Thus, in some embodiments, sliding the first tab 128 along a first rail 140*a* to the open position 138*a* releases the tensioned locking member 132 upwardly, against the second tab 130 to lock the second tab 130 in the closed position 138*b*. In yet other embodiments, sliding the second tab 130 along a second rail 140*b* to the open position 138*a* releases the tensioned locking member 132 upwardly, against the first tab 128 to lock the first tab 128 in the closed position 138*b*. In this manner, the released locking member 132 is arranged in a snug engagement with the first tab 128 or the second tab 130.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A vacuum insulated container, the container comprising:
   a body defined by a base wall, a side wall extending from the base wall and terminating at an upper portion that forms an open mouth, and a medial wall bifurcating the body into a first compartment and a second compartment, the first and second compartments forming two segregated inner volumes, the walls consisting of two barriers made of a heat insulating material, the barriers being separated by a space, wherein the space between the barriers is substantially evacuated to provide vacuum insulation; and
   a cap carried by the upper portion of the side wall, the cap defined by an inner face, an outer face, and a perimeter region detachably coupled to the open mouth of the side wall, the cap having a first tab positioned over the inner volume of the first compartment, the cap further having a second tab positioned over the inner volume of the second compartment,
   the tabs enabling access to the inner volumes of the compartments from an open position, the tabs restricting access to the inner volumes of the compartments from a closed position;
   the cap further having a tensioned locking member operatively connected to the tabs, the tensioned locking member operatively connected to a spring, wherein the spring biases the tensioned locking member against the tabs;
   each tab being movable to the open position independently of the other, wherein displacing the first tab to the open position causes the tensioned locking member to lock the second tab in the closed position, wherein movement of the second tab to the open position releases the tensioned locking member to lock the first tab in the closed position.

2. The container of claim 1, wherein the body has an elongated cylindrical shape.

3. The container of claim 1, wherein the heat insulating material includes at least one of the following: foam, polyurethane, polyvinyl chloride, polystyrene, a polymer, glass-lined aluminum, double walled paper, ceramic material, stoneware, metal, wood, and glass.

4. The container of claim 1, wherein the cap has a generally disc shape.

5. The container of claim 1, further comprising an annular gripping portion.

6. The container of claim 1, wherein the gripping portion encircles a portion of the side wall of the body.

7. The container of claim 1, wherein the gripping portion is textured.

8. The container of claim 1, wherein the first tab slides between the open and closed positions.

9. The container of claim 8, wherein the second tab slides between the open and closed positions.

10. The container of claim 9, wherein the first tab and the second tab slide in a collinear direction.

11. The container of claim 10, wherein the first tab slides along a pair of first rails.

12. The container of claim 11, wherein the second tab slides along a pair of second rails.

13. The container of claim 12, wherein sliding the first tab to the open position releases the tensioned locking member upwardly, against the second tab.

14. The container of claim 13, wherein sliding the second tab to the open position releases the tensioned locking member upwardly, against the first tab.

15. The container of claim 14, wherein the released locking member is arranged in a snug engagement with the first tab or the second tab.

16. A vacuum insulated container, the container comprising:
a body defined by a base wall, a side wall extending from the base wall and terminating at an upper portion that forms an open mouth, and a medial wall bifurcating the body into a first compartment and a second compartment, the first and second compartments forming two segregated inner volumes, the walls consisting of two barriers made of a heat insulating material, the barriers being separated by a space,
wherein the space between the barriers is substantially evacuated to provide vacuum insulation;
an annular gripping portion encircling a portion of the side wall of the body, the gripping portion defined by a texture; and
a cap carried by the upper portion of the side wall, the cap defined by an inner face, an outer face, and a perimeter region detachably coupled to the open mouth of the side wall, the cap having a first tab positioned over the inner volume of the first compartment, the cap further having a second tab positioned over the inner volume of the second compartment,
the tabs enabling access to the inner volumes of the compartments from an open position, the tabs restricting access to the inner volumes of the compartments from a closed position the cap further having a tensioned locking member biased against the first and second tabs by a spring;
each tab being slidable to the open position independently of the other, wherein sliding the first tab to the open position releases the tensioned locking member against the second tab to lock the second tab in the closed position,
wherein sliding the second tab to the open position releases the tensioned locking member against the first tab to lock the first tab in the closed position.

17. The container of claim 16, further comprising a second medial wall adjacent, and parallel to the medial wall, the second medial wall enhancing insulation between the first and second compartments.

18. The container of claim 16, wherein the heat insulating material includes at least one of the following: foam, polyurethane, polyvinyl chloride, polystyrene, a polymer, glass-lined aluminum, double walled paper, ceramic material, stoneware, metal, wood, and glass.

19. The container of claim 16, wherein the cap has a generally disc shape.

20. A vacuum insulated container, the container consisting of:
a cylindrical body defined by a base wall, a side wall extending from the base wall and terminating at an upper portion that forms an open mouth, and a medial wall bifurcating the body into a first compartment and a second compartment, the first and second compartments forming two segregated inner volumes, the walls consisting of two barriers made of a heat insulating material, the barriers being separated by a space;
the body further defined by a second medial wall adjacent and parallel to the medial wall, the second medial wall enhancing insulation between the first and second compartments, wherein the space between the barriers is substantially evacuated to provide vacuum insulation;
wherein the first compartment contains a first fluid having a first temperature, and the second compartment contains a second fluid having a second temperature;
an annular gripping portion encircling a portion of the side wall of the body, the gripping portion defined by a texture; and
a disc-shaped cap carried by the upper portion of the side wall, the cap defined by an inner face, an outer face, and a perimeter region detachably coupled to the open mouth of the side wall, the cap having a first tab positioned over the inner volume of the first compartment, the cap further having a second tab positioned over the inner volume of the second compartment, the cap further having a tensioned locking member operatively connected to the tabs, the tabs enabling access to the inner volumes of the compartments from an open position, the tabs restricting access to the inner volumes of the compartments from a closed position;
the tensioned locking member is biased against the first and second tabs by a spring, wherein the spring and tensioned locking member allow only one of the tabs to move at a time;
each tab being slidable to the open position independently of the other, wherein the first tab and the second tab slide in a collinear direction;
wherein sliding the first tab along a first rail to the open position releases the tensioned locking member upwardly, against the second tab to lock the second tab in the closed position;
wherein sliding the second tab along a second rail to the open position releases the tensioned locking member upwardly, against the first tab to lock the first tab in the closed position.

* * * * *